B. E. Sampson.
Thill Coupling.
No. 48,313.    Patented Jun. 20, 1865.
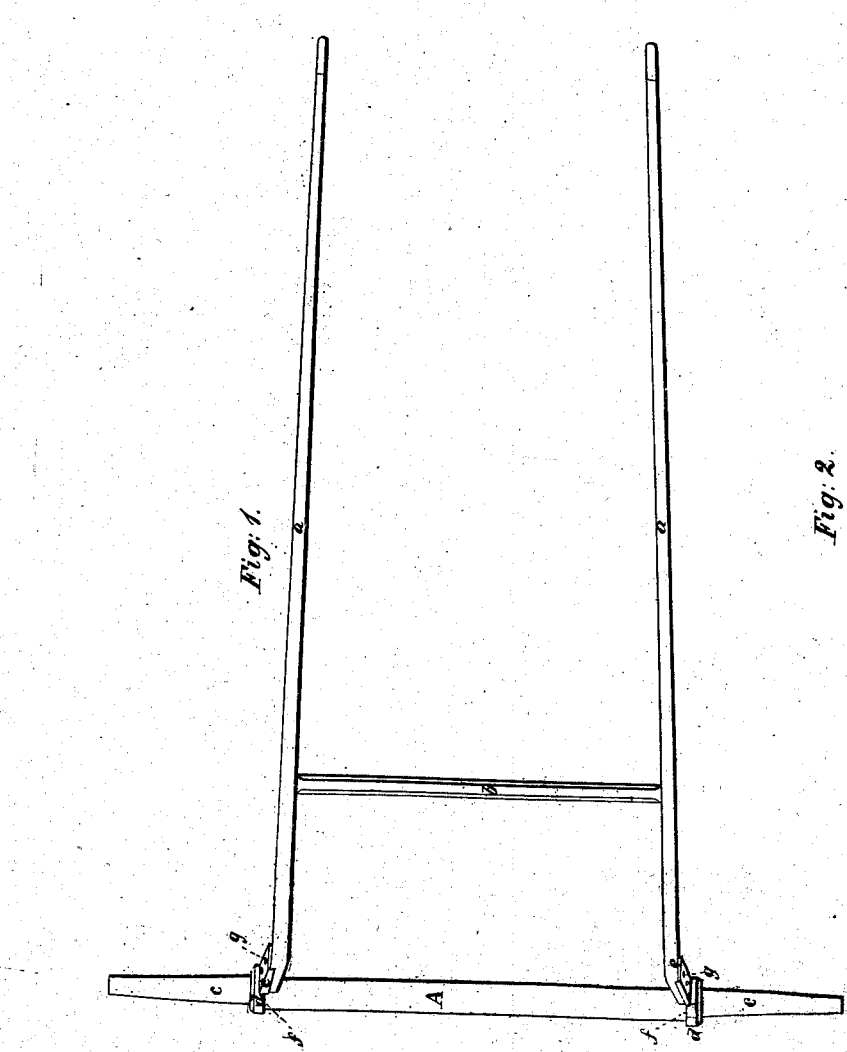
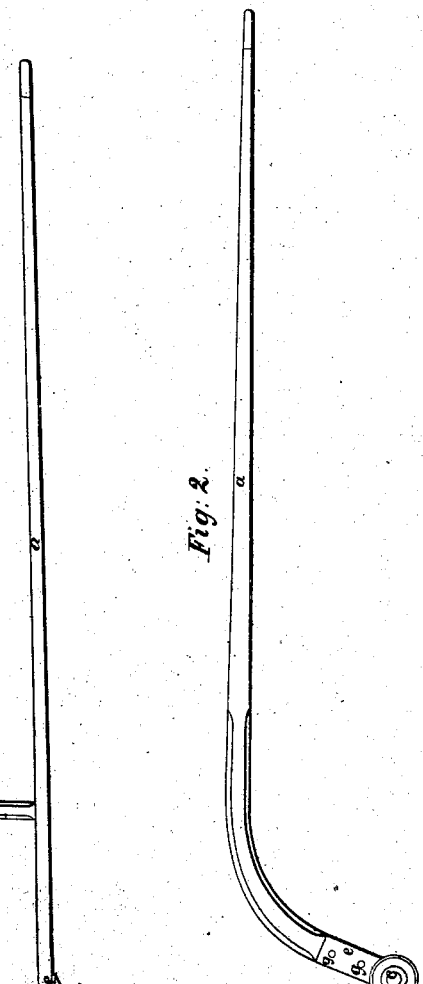
Witnesses,
Frederick Curtis.
A. P. Hale Jr.
Inventor:
Blaney E. Sampson.
by his attorney.
R. H. Eddy

UNITED STATES PATENT OFFICE.

BLANEY E. SAMPSON, OF BOSTON, MASSACHUSETTS.

IMPROVEMENT IN CONNECTING THILLS TO CARRIAGES.

Specification forming part of Letters Patent No. 48,313, dated June 20, 1865.

*To all whom it may concern:*

Be it known that I, BLANEY E. SAMPSON, of Boston, in the county of Suffolk and State of Massachusetts, have invented a new and useful Improvement in Carriages, or in the application of thills to the axles thereof; and I do hereby declare the same to be fully described in the following specification and represented in the accompanying drawings, of which—

Figure 1 is a top view, and Fig. 2 a side view, of a pair of thills and a carriage-axle applied together in accordance with my invention.

In the said drawings, *a a* are the thills; *b*, their connection-bar; and A, the axle, of which *c c* are the arms or journals.

In carrying out my invention I so apply the thills to the axles as to enable them to revolve or turn on its arms, or, in other words, I circumscribe each journal *c* by a collar or short tube, *d*, having an arm, *e*, projecting from it. These collars are to be placed closely against the shoulders *f f* of the journals, and the thills are to be fastened by screw-bolts *g g* to the arms or such collars, the whole being arranged as shown in the drawings. By turning the screw-bolts of one of the arms *c* and separating the arm from the thill it will be an easy matter to remove the thills from their connection with the axle. The wheels, when applied to the axle-journals, work closely against the collars, the thills being free to turn on the axle instead of being applied to start projecting therefrom and fastened therein or thereto.

Thills, when applied to an axle in my improved manner, are not so apt to become accidentally disconnected therefrom as they are when held to struts by screw-bolts, and, besides, they work with less noise and wear.

I claim as my invention—

The application of the thills to the arms or journals of an axle by means substantially as described, whereby they may be supported by and turn on such arms while in use.

BLANEY E. SAMPSON.

Witnesses:
F. P. HALE, Jr.,
R. H. EDDY.